(12) United States Patent
Han et al.

(10) Patent No.: US 10,648,083 B2
(45) Date of Patent: May 12, 2020

(54) PRE-COATING AGENT COMPOSITION FOR GRAIN-ORIENTED ELECTRICAL STEEL SHEET, GRAIN-ORIENTED ELECTRICAL STEEL SHEET COMPRISING SAME, AND MANUFACTURING METHOD THEREFOR

(71) Applicant: POSCO, Pohang-si, Gyeongsangbuk-do (KR)

(72) Inventors: Min Soo Han, Pohang-si (KR); Soon-Bok Park, Pohang-si (KR); Bungkwan Shon, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 444 days.

(21) Appl. No.: 15/502,440

(22) PCT Filed: Dec. 4, 2014

(86) PCT No.: PCT/KR2014/011811
§ 371 (c)(1),
(2) Date: Feb. 7, 2017

(87) PCT Pub. No.: WO2016/021782
PCT Pub. Date: Feb. 11, 2016

(65) Prior Publication Data
US 2017/0233871 A1 Aug. 17, 2017

(30) Foreign Application Priority Data
Aug. 7, 2014 (KR) .................. 10-2014-0101455

(51) Int. Cl.
| | | |
|---|---|---|
| *C21D 3/04* | (2006.01) | |
| *C23C 22/07* | (2006.01) | |
| *C21D 8/12* | (2006.01) | |
| *C23C 22/74* | (2006.01) | |
| *C23C 22/20* | (2006.01) | |
| *C23C 22/22* | (2006.01) | |
| *H01F 1/18* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/60* | (2006.01) | |
| *C23C 8/02* | (2006.01) | |
| *C23C 8/26* | (2006.01) | |
| *C23C 8/80* | (2006.01) | |
| *C23C 28/04* | (2006.01) | |
| *H01F 1/147* | (2006.01) | |
| *C04B 111/00* | (2006.01) | |

(52) U.S. Cl.
CPC ............ *C23C 22/07* (2013.01); *C21D 3/04* (2013.01); *C21D 8/1222* (2013.01); *C21D 8/1233* (2013.01); *C21D 8/1255* (2013.01); *C21D 8/1261* (2013.01); *C21D 8/1272* (2013.01); *C21D 8/1283* (2013.01); *C21D 8/1288* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/60* (2013.01); *C23C 8/02* (2013.01); *C23C 8/26* (2013.01); *C23C 8/80* (2013.01); *C23C 22/20* (2013.01); *C23C 22/22* (2013.01); *C23C 22/74* (2013.01); *C23C 28/04* (2013.01); *H01F 1/14775* (2013.01); *H01F 1/18* (2013.01); *C04B 2111/00525* (2013.01)

(58) Field of Classification Search
CPC .. C23C 22/07; C23C 8/02; C23C 8/26; C23C 8/80; C23C 22/20; C23C 22/22; C23C 22/74; C23C 28/04; C21D 3/04; C21D 8/1222; C21D 8/1233; C21D 8/1255; C21D 8/1261; C21D 8/1272; C21D 8/1283; C21D 8/1288; C21D 9/46; C22C 38/001; C22C 38/002; C22C 38/008; C22C 38/02; C22C 38/04; C22C 38/06; C22C 38/60; H01F 1/14775; H01F 1/18; C04B 2111/00525
See application file for complete search history.

(56) References Cited

U.S. PATENT DOCUMENTS

| | | | | |
|---|---|---|---|---|
| 6,461,741 | B1 * | 10/2002 | Takeda .................. | C04B 28/346 427/127 |
| 2003/0180553 | A1 * | 9/2003 | Shigesato ............ | C21D 8/1272 428/469 |

(Continued)

FOREIGN PATENT DOCUMENTS

| | | |
|---|---|---|
| CN | 1291661 A | 4/2001 |
| CN | 102119239 A | 7/2011 |

(Continued)

OTHER PUBLICATIONS

International Search Report dated May 1, 2015 issued in International Patent Application No. PCT/KR2014/011811 (with English translation).

(Continued)

*Primary Examiner* — Jonathan C Langman
(74) *Attorney, Agent, or Firm* — Morgan, Lewis & Bockius LLP

(57) ABSTRACT

A pre-coating agent composition for a grain-oriented electrical steel sheet, a grain-oriented electrical steel sheet including the same, and a manufacturing method thereof are provided. Particularly, a pre-coating agent composition for a grain-oriented electrical steel sheet including an acid containing boron (B); and a solvent, a grain-oriented electrical steel sheet including the same, and a manufacturing method thereof are provided.

4 Claims, No Drawings

(56) References Cited

U.S. PATENT DOCUMENTS

2012/0305140 A1* 12/2012 Yamazaki ................ C21D 8/12
                                                                148/253
2015/0132547 A1*  5/2015 Inoue .................... C22C 38/001
                                                                428/201

FOREIGN PATENT DOCUMENTS

| | | |
|---|---|---|
| JP | S53-028043 A | 3/1978 |
| JP | S54-143737 A | 11/1979 |
| JP | H07-278833 A | 10/1995 |
| JP | H08277474 A | 10/1996 |
| JP | H09-272982 A | 10/1997 |
| JP | H11-302858 A | 11/1999 |
| JP | 2005-139481 A | 6/2005 |
| KR | 10-2001-0030384 A | 4/2001 |
| KR | 10-2003-0052205 A | 6/2003 |
| KR | 10-2006-0074659 A | 7/2006 |
| KR | 10-2014-0092467 A | 7/2014 |
| WO | 2014/104762 A1 | 7/2014 |

OTHER PUBLICATIONS

European Search Report dated Jul. 17, 2017 issued in European Patent Application No. 14899094.8.

* cited by examiner

PRE-COATING AGENT COMPOSITION FOR GRAIN-ORIENTED ELECTRICAL STEEL SHEET, GRAIN-ORIENTED ELECTRICAL STEEL SHEET COMPRISING SAME, AND MANUFACTURING METHOD THEREFOR

CROSS REFERENCE

This patent application is the U.S. National Phase under 35 U.S.C. § 371 of International Application No. PCT/KR2014/011811, filed on Dec. 4, 2014, which claims the benefit of Korean Patent Application No. 10-2014-0101455, filed on Aug. 7, 2014, the entire contents of each are hereby incorporated by reference.

TECHNICAL FIELD

The present invention relates to a pre-coating agent composition for a grain-oriented electrical steel sheet, a grain-oriented electrical steel sheet including the same, and a manufacturing method thereof.

BACKGROUND ART

A grain-oriented electrical steel sheet contains 3.1% of a Si component, and has an aggregation texture in which an orientation of crystal grains is aligned at a direction of (110)[001]. This is mainly used as an iron core of a transformer, an electric motor, a generator, other electronic devices and the like, and uses extremely excellent magnetic properties at a rolling direction.

Recently, as a high magnetic flux density grade grain-oriented electrical steel sheet is commercialized, materials having less iron loss are required. This may be approached by the following four main technical methods: i) precisely orienting the {110}<001> crystal grain orientation including an easy magnetization axis of grain-oriented electrical steel sheet at a rolling direction, ii) rendering a material to be a thin plate, iii) miniaturizing a magnetic domain by a chemical or physical process, and iv) improving surface physical properties or imparting surface tension by a chemical process such as surface treating.

The last method among the above is to improve magnetism of a material by actively improving the properties of a grain-oriented electrical steel sheet surface. As a representative example thereof, a method of removing an oxide layer inevitably produced in the course of decarbonizing-annealing, and forsterite ($Mg_2SiO_4$) film, that is a base coating layer produced by a chemical reaction of MgO slurry which is a coil fusion inhibitor may be mentioned.

However, the biggest problem of the grain-oriented electrical steel sheet from which the base coating layer is removed as such is that the surface of the manufactured material is too attractive and has low roughness. Because of this, it is difficult to form an insulation coating layer on the material, and due to the absence of a base coating layer, when a general insulation coating agent is used, an insulation level required for an ordinary grain-oriented electrical steel sheet may not be expected.

DISCLOSURE

Technical Problem

DESCRIPTION OF THE DRAWINGS

The present invention has been made in an effort to provide a pre-coating agent composition for a grain-oriented electrical steel sheet, a grain-oriented electrical steel sheet including the same, and a manufacturing method thereof having advantages of excellent adhesion, by introducing a pre-coating layer resistant to cracks by thermal stress, and then carrying out tension coating, The details thereon are as follows:

An example embodiment of the present invention provides a pre-coating agent composition for a grain-oriented electrical steel sheet, including an acid containing boron (B) and a solvent, in an appropriate amount.

Another embodiment of the present invention provides a grain-oriented electrical steel sheet in which a pre-coating layer is introduced between a material and a tension coating layer.

Yet another embodiment, of the present invention provides a method of manufacturing the grain-oriented electrical steel sheet by a simple application process.

Technical Solution

According to an embodiment of the present invention, a pre-coating agent composition for a grain-oriented electrical steel sheet including an acid containing boron (B); and a solvent is provided.

Specifically, the acid containing boron (B) may be at least one selected from the group consisting of borinic acid, boronic acid, boric acid and a combination thereof.

Further, the pre-coating agent composition may further include metal dihydrogen phosphates; and a silicate compound.

In this case, the composition of the composition may be 20 to 40 parts by weight of the silicate compound, 5 to 15 parts by weight of the acid containing boron (B), and 300 to 500 parts by weight of the solvent, based on 100 parts by weight of the metal dihydrogen phosphates.

The metal dihydrogen phosphates may be one or more selected from the group consisting of aluminum dihydrogen phosphate ($Al(H_2PO_4)_3$), magnesium dihydrogen phosphate ($Mg((H_2PO_4)_2)$) and a combination thereof. Specifically, aluminum dihydrogen phosphate ($Al(H_2PO_4)_3$) and magnesium dihydrogen phosphate ($Mg((H_2PO_4)_2)$) are included, and aluminum dihydrogen phosphate ($Al(H_2PO_4)_3$) may be included at 20 to 80 wt %, based on total 100 wt % of the metal dihydrogen phosphates.

Meanwhile, the silicate compound may be one or more selected from the group consisting of silica dispersed in a dispersion medium in a colloid form, solid silica in a powder form and a combination thereof.

Further, the solvent may be water.

According to another embodiment of the present invention, a grain-oriented electrical steel sheet including a grain-oriented electrical steel sheet; a pre-coating layer formed on a surface of the grain-oriented electrical steel sheet; and a tension coating layer formed on a surface of the pre-coating layer is provided, wherein the grain-oriented electrical steel sheet is a grain-oriented electrical steel sheet from which a forsterite ($Mg_2SiO_4$) film is removed, the pre-coating layer includes an acid containing boron (B) and a solvent, and adhesion between the grain-oriented electrical steel sheet and the tension coating layer is controlled by the pre-coating layer.

Specifically, the acid containing boron (B) may be at least one selected from the group consisting of borinic acid, boronic acid, boric acid, and a combination thereof.

In addition, the pre-coating layer may further include metal dihydrogen phosphates; and a silicate compound.

In this case, the composition of the pre-coating layer may be 20 to 40 parts by weight of the silicate compound, 5 to 15 parts by weight of the acid containing boron (B), and 300 to 500 parts by weight of the solvent, based on 100 parts by weight of the metal dihydrogen phosphates.

Here, the metal dihydrogen phosphates in the pre-coating layer may be one or more selected from the group consisting of aluminum dihydrogen phosphate ($Al(H_2PO_4)_3$), magnesium dihydrogen phosphate ($Mg((H_2PO_4)_2$) and a combination thereof.

In addition, the silicate compound in the pre-coating layer may be one or more selected from the group consisting of silica dispersed in a dispersion medium in a colloid form, solid silica in a powder form, and a combination thereof.

Meanwhile, the composition of the grain-oriented electrical steel sheet may include Sn: 0.03 to 0.07 wt %, Sb: 0.01 to 0.05 wt %, P: 0.01 to 0.05 wt %, Fe, and inevitably added impurities.

Here, the adhesion of the pre-coating layer may be 10 to 20 mmφ.

In addition, the film tension of the tension coating layer may be 0.3 to 0.6 kgf/mm².

The ratio of the thickness of the pre-coating layer to the thickness of the tension coating layer may be 2:1 to 20:1.

The ratio of the total thickness of the pre-coating layer and tension coating layer to the thickness of the grain-oriented electrical steel sheet may be 35:1 to 75:1.

The composition of the tension coating layer may be 50 to 250 parts by weight of colloidal silica, 5 to 15 parts by weight of chromium oxide, 5 to 15 parts by weight of solid silica powder, and 20 to 100 parts by weight of a solvent, based on 100 parts by weight of a metal dihydrogen phosphate solution.

The metal dihydrogen phosphates may be one or more selected from the group consisting of aluminum dihydrogen phosphate, magnesium dihydrogen phosphate and a combination thereof.

According to still another embodiment of the present invention, a method of manufacturing a grain-oriented electrical steel sheet, including: preparing a grain-oriented electrical steel sheet from which a forsterite ($Mg_2SiO_4$) film is removed; forming a pre-coating layer on a surface of the grain-oriented electrical steel sheet from which the forsterite ($Mg_2SiO_4$) film is removed; and forming a tension coating layer on a surface of the pre-coated grain-oriented electrical steel sheet is provided, wherein the pre-coating layer includes an acid containing boron (B) and a solvent, and adhesion between the grain-oriented electrical steel sheet from which the forsterite ($Mg_2SiO_4$) film is removed and the tension coating layer is controlled by the pre-coating layer.

The step of preparing the grain-oriented electrical steel sheet from which a forsterite ($Mg_2SiO_4$) film is removed includes preparing a steel slab including Sn: 0.03 to 0.07 wt %, Sb: 0.01 to 0.05 wt %, P: 0.01 to 0.05 wt %, Fe and other inevitably added impurities; hot-rolling the steel slab to prepare a hot-rolled sheet; subjecting the hot-rolled sheet to annealing and acid-washing; cold-rolling the annealed and acid-washed steel sheet to prepare a cold-rolled sheet; decarbonizing and nitriding-annealing the cold-rolled sheet; and high temperature annealing the decarbonized and nitrided-annealed steel sheet, wherein the decarbonized and nitrided-annealing is carried out at dew point in a range of 35 to 55° C., and the high temperature annealing is carried out by applying an additive containing MgO.

Here, the additive may include MgO; an annealing separating agent including antimony oxychloride (SbOCl) and antimony sulfate ($Sb_2(SO_4)_3$); and water.

The high temperature annealing may be carried out at a heating rate of 18 to 75° C./hr in a temperature range of 700 to 950° C., and at a heating rate of 10 to 15° C./hr in a temperature range of 950 to 1200° C.

Meanwhile, after the step of high temperature annealing the decarbonized and nitrided-annealed steel sheet, acid-washing and correcting may be further included.

The step of forming a pre-coating layer on a surface of the grain-oriented electrical steel sheet from which the forsterite ($Mg_2SiO_4$) film is removed may include preparing a mixed solution of an acid containing boron (B) and water; applying the mixed solution on the grain-oriented electrical steel sheet; and drying the grain-oriented electrical steel sheet on which the mixed solution is applied.

Specifically, the acid containing boron (B) may be at least one selected from the group consisting of borinic acid, boronic acid, boric acid, and a combination thereof.

In addition, the mixed solution may further include metal dihydrogen phosphates; and a silicate compound.

Here, the mixed solution of an acid containing boron (B) and water may be carried out by adding and mixing 20 to 40 parts by weight of the silicate compound, 5 to 15 parts by weight of the acid containing boron (B), and 300 to 500 parts by weight of water, based on 100 parts by weight of the metal dihydrogen phosphates.

The metal dihydrogen phosphates may be one or more selected from the group consisting of aluminum dihydrogen phosphate ($Al(H_2PO_4)_3$), magnesium dihydrogen phosphate ($Mg((H_2PO_4)_2$), and a combination thereof.

The step of applying the mixed solution on the grain-oriented electrical steel sheet may be carried out by evenly distributing 0.5 to 3.0 g/m² of the mixed solution on the surface of the grain-oriented electrical steel sheet.

The step of drying the grain-oriented electrical steel sheet on which the mixed solution is applied may be carried out by drying at 250 to 550° C. for 15 to 30 seconds.

The step of forming a tension coating layer on the surface of the pre-coated grain-oriented electrical steel sheet may include preparing a tension coating agent including colloidal silica and metal dihydrogen phosphates; applying the tension coating agent on the pre-coated grain-oriented electrical steel sheet; heating the grain-oriented electrical steel sheet on which the tension coating agent is applied; and slowly cooling after the heating step.

The composition of the tension coating agent may be 50 to 250 parts by weight of the colloidal silica, 5 to 15 parts by weight of chromium oxide, 5 to 15 parts by weight of solid silica powder, and 20 to 100 parts by weight of the solvent, based on 100 parts by weight of the metal dihydrogen phosphate solution.

The metal dihydrogen phosphates may be one or more selected from the group consisting of aluminum dihydrogen phosphate, magnesium phosphate, and a combination thereof.

The step of applying the tension coating agent on the pre-coated grain-oriented electrical steel sheet may be carried out by evenly distributing 0.5 to 6.0 g/m² of the tension coating agent on the surface of the pre-coated grain-oriented electrical steel sheet.

The step of heating the grain-oriented electrical steel sheet on which the tension coating agent is applied may be carried out by heating at a temperature range of 550 to 900° C. for 10 to 50 seconds.

After the heating step, the step of slowly cooling may be carried out at a temperature range of 200 to 550° C. for 10 to 30 seconds.

Advantageous Effects

In an embodiment of the present invention, a pre-coating agent composition for a grain-oriented electrical steel sheet which may impart strong adhesion between a material and a tension coating layer, may be provided.

In another embodiment of the present invention, adhesion is improved by a pre-coating layer introduced between a material and a tension coating layer, which may lead to a grain-oriented electrical steel sheet having improved film tension.

In still another embodiment of the present invention, a method of manufacturing a grain-oriented electrical steel sheet having the above properties may be provided.

MODE FOR INVENTION

Hereinafter, an embodiment of the present invention will be described in detail. However, this is presented as an example, and the present invention is not limited thereto, but defined by the scope of the claims as described below.

In an embodiment of the present invention, a pre-coating agent composition for a grain-oriented electrical steel sheet including an acid containing boron (B); and a solvent is provided.

Generally, when a base coating layer of the grain-oriented electrical steel sheet, that is, a forsterite ($Mg_2SiO_4$) film is removed, the surface thereof is too attractive and has low roughness, so that the adhesion thereof is very poor even in the case of forming a tension coating layer, which causes insulation and film tension to be lowered.

As a method for solving these problems, in the case of applying the pre-coating agent composition between the grain-oriented electrical steel sheet from which the base coating layer is removed and a tension coating layer, and then introducing the pre-coating layer through a series of processes as described below, the adhesion between the material and the tension coating layer may be significantly improved, and eventually insulation and film tension of the grain-oriented electrical steel sheet may be improved.

This is because wettability to the grain-oriented electrical steel sheet from which the base coating layer is removed may be improved, by a hydroxyl group (—OH) included in the acid containing boron (B).

Hereinafter, the composition according to an embodiment of the present invention will be described in more detail.

First, the acid containing boron (B) is not particularly limited, as long as it contains boron (B) and a hydroxyl group (—OH).

Specifically, it may be at least one selected from the group consisting of borinic acid, boronic acid, boric acid and a combination thereof.

More specifically, in the chemical formula of the exemplified material, the borinic acid may be represented by $H_2BOH$, the boronic acid may be represented by $RB(OH)_2$, and the boric acid may be represented by $H_3BO_3$ (when it is ortho-boric acid), $HBO_2$ (when it is meta-boric acid), or $H_2B_4O_7$ (when it is tetra-boric acid), respectively.

Since these materials are acids including boron (B) and a hydroxyl group (OH) in common, they are advantageous to improve wettability to the grain-oriented electrical steel sheet from which the base coating layer is removed, as described above.

In addition, the pre-coating agent composition may further include metal dihydrogen phosphates; and a silicate compound.

The problem of poor insulation as described above is intended to be solved by introducing organic substituted silica to the composition, since when the composition including this is dried at high temperature, organics in the silica may be selectively thermally degraded, which may lead to nanoporous voids.

In addition, the problem of poor adhesion as described above is intended to be solved by properly adjusting a solid fraction of the metal dihydrogen phosphates in the composition, since the composition including this may show excellent adhesion to and an interface property with a base coating free grain-oriented electrical steel sheet, and correspondingly improve film tension.

In this case, the composition of the composition may be 20 to 40 parts by weight of the silicate compound, 5 to 15 parts by weight of the acid containing boron (B), and 300 to 500 parts by weight of the solvent, based on 100 parts by weight of the metal dihydrogen phosphates. The reason to define the composition as described above is as follows:

Silicate compound: when the silicate compound is included at less than 20 parts by weight, based on 100 parts by weight of the metal dihydrogen phosphates, the pre-coating layer formed by the composition has too low coat hardness, so that film tension may not be imparted even in the case of forming a tension coating layer on the surface. In contrast, when the silicate compound is included at more than 40 parts by weight, the coefficient of thermal expansion is too low, so that the composition may be released in the cooling step after applying the composition. Accordingly, the composition of the silicate compound is defined by the above range. In addition, the effect of the definition is supported by the Experimental Examples as described below.

Acid containing boron (B): the acid containing boron (B) functions to improve wettability by lowering the surface tension of the composition, and at less than 5 parts by weight, based on 100 parts by weight of the metal dihydrogen phosphates, such function is difficult to be expected, and above 15 parts by weight, there is a high possibility to be precipitated in the composition, and thus, the above range is limited.

Solvent: when the solvent is included at less than 300 parts by weight, based on 100 parts by weight of the metal dihydrogen phosphates, the solid content thereof in the composition is increased, and thus, the pre-coating layer formed by the composition may have lowered adhesion to the base coating-free grain-oriented electrical steel sheet. In contrast, when the solvent is included at more than 500 parts by weight, the viscosity of the composition is lowered and the surface tension is increased, thereby deteriorating wettability. Therefore, the composition of the solvent is limited to the above range.

Meanwhile, the metal dihydrogen phosphates may be one or more selected from the group consisting of aluminum dihydrogen phosphate ($Al(H_2PO_4)_3$), magnesium dihydrogen phosphate ($Mg((H_2PO_4)_2$) and a combination thereof.

Specifically, aluminum dihydrogen phosphate ($Al(H_2PO_4)_3$) and magnesium dihydrogen phosphate ($Mg((H_2PO_4)_2$) are included, and aluminum dihydrogen phosphate ($Al(H_2PO_4)_3$) is included at 20 to 80 wt %, based on total 100 wt % of the metal dihydrogen phosphates.

More specifically, above 80 wt %, it is advantageous for film tension, but heat resistance of aluminum dihydrogen phosphate itself is insufficient, which leads to iron loss deterioration when stress removal annealing for fabricating a wound iron core type transformer. In contrast, at less than 20 wt %, film tension is reduced, so that an iron loss improvement rate by the tension coating is insufficient. Thus, the range was limited as described above.

Meanwhile, the silicate compound may be one or more selected from the group consisting of silica dispersed in a dispersion medium in a colloid form or solid silica in a powder form and a combination thereof.

In addition, the solvent may be water.

Another embodiment of the present invention provides a grain-oriented electrical steel sheet including: a grain-oriented electrical steel sheet; a pre-coating layer formed on the grain-oriented electrical steel sheet; and a tension coating layer formed on a surface of the pre-coating layer, wherein the grain-oriented electrical steel sheet is a grain-oriented electrical steel sheet from which a forsterite ($Mg_2SiO_4$) film is removed, the pre-coating layer includes an acid containing boron (B) and solvent, and the adhesion between the grain-oriented electrical steel sheet and the tension coating layer is controlled by the pre-coating layer.

Specifically, the grain-oriented electrical steel sheet may be that from which the base coating layer is removed, and the pre-coating layer is applied between the grain-oriented electrical steel sheet from which the base coating layer is removed and tension coating layer, thereby overcoming the separation of the coat layer which occurs when applying only the tension coating layer, and at the same time, imparting excellent film tension.

Hereinafter, the grain-oriented electrical steel sheet according to an embodiment of the present invention will be described in detail. However, specific description will be omitted for the overlapping part with the above description.

Specifically, the pre-coating layer is described below, and the details thereof is as described above.

The acid containing boron (B) may be at least one selected from the group consisting of borinic acid, boronic acid, boric acid, and a combination thereof.

Further, the pre-coating layer may further include metal dihydrogen phosphates; and a silicate compound.

The composition of the pre-coating layer may be 20 to 40 parts by weight of the silicate compound, 5 to 15 parts by weight of the acid containing boron (B), and 300 to 500 parts by weight of the solvent, based on 100 parts by weight of the metal dihydrogen phosphates.

Here, the metal dihydrogen phosphates in the pre-coating layer may be one or more selected from the group consisting of aluminum dihydrogen phosphate ($Al(H_2PO_4)_3$), magnesium dihydrogen phosphate ($Mg((H_2PO_4)_2$) and a combination thereof.

Further, the silicate compound in the pre-coating layer may be one or more selected from the group consisting of silica dispersed in a dispersion medium in a colloid form, solid silica in a powder form, and a combination thereof.

Meanwhile, the composition of the grain-oriented electrical steel sheet may include Sn: 0.03 to 0.07 wt %, Sb: 0.01 to 0.05 wt %, P: 0.01 to 0.05 wt %, Fe, and other inevitably added impurities. The reasons for limiting each composition as the above are as follows:

Sn: when the content of Sn is limited to the above range, iron loss may be reduced. Specifically, when Sn is added, iron lass may be improved by increasing the number of secondary nuclei at the {110}<001> orientation, in order to decrease the size of secondary crystal grains. Further, Sn has an important function to suppress crystal grain growth through segregation in a grain boundary, which compensates for reduction of the effect to suppress crystal grain growth, as AlN particles coarsen, and the content of Si increases.

Accordingly, successful formation of a {110}<001> secondary recrystallization aggregation texture may be consequently guaranteed even in the case of having a relatively high content of Si. That is, the Si content may be increased, and also the final thickness may be decreased without no weakening the completeness of a {110}<001> secondary recrystallization structure.

Further, when the Sn content is excessive, brittleness may be increased, and thus, it is effective for improvement of brittleness to control the content within the above range.

*87Sb: Sb serves to suppress excessive growth of primary recrystallized grains by being segregated in a grain boundary. Specifically, grain growth in the primary recrystallization step is controlled, thereby removing the nonuniformity of a primary recrystallized grain size depending on the thickness direction of the sheet, and at the same time, secondary recrystallization is stably formed, thereby forming a grain-oriented electrical steel sheet having better magnetism.

More specifically, when Sb is included at less than 0.01 wt %, the mentioned function may be difficult to be exhibited well. On the contrary, when Sb is included at more than 0.05 wt %, the size of primary recrystallized grains may be too small, and accordingly, the initiation temperature of secondary recrystallization becomes lowered. Thus, as the magnetic properties are deteriorated, or suppressing force of grain growth is too high, the secondary recrystallization may not occur. Accordingly, the range is limited as described above.

P: P promotes the growth of primary recrystallized grains in a low temperature heating type grain-oriented electrical steel sheet, and thus, serves to increase the integration of the {110}<001> orientation in the final product by increasing secondary recrystallization temperature. Specifically, when primary recrystallized grains are excessive, secondary recrystallization is unstable, however, it is advantageous for magnetism to have large primary recrystallized grains in order to raise secondary recrystallization temperature, as long as secondary recrystallization occurs.

Meanwhile, P increases the number of crystal grains having the {110}<001> orientation in the primary recrystallized steel sheet to lower iron loss in the final product, and also strongly develops {111}<112> aggregation texture in the primary recrystallized sheet to improve the {110}<001> integration in the final product, thereby increasing magnetic flux density. Further, P has a function to enhance suppression force by being segregated in a grain boundary up to a high temperature of about 1000° C. to delay decomposition of precipitates, when secondary recrystallization annealing.

0.01 wt % or more is required for exerting the effect of P well, but the size of primary recrystallized grains is rather decreased at more than 0.05 wt %, so that secondary recrystallization is unstable, and also brittleness is increased to hinder cold rolling. Accordingly, the range is limited as described above.

Here, the pre-coating layer may have adhesion of 10 to 20 limp. When the adhesion is more than 20 mmφ, the adhesive strength between the tension coating layer and a parent material, which is the original purpose of the pre-coating layer cannot be provided, and when the adhesion is less than 10 mmφ, the surface of the parent material is not sufficiently applied, and partially exposed, and thus, the range is defined as described above.

Further, the tension coating layer may have film tension of 0.3 to 0.6 kgf/mm². The reason for limiting the film tension as such is that the iron loss improvement rate by tension coating is insignificant at less than 0.3 kgf/mm², and the tension by a coat is unduly strong above 0.6 kgf/mm², so that the coat is separated from the pre-coating layer.

The ratio of the thickness of the pre-coating layer to the thickness of the tension coating layer may be 2:1 to 20:1. When the ratio is above the upper limit, the film tension by the tension coating is unduly strong so that the coat may be separated from the pre-coating layer, and when the ratio is under the lower limit, the pre-coating layer is unduly thick, so that the adhesive strength between a parent material and the tension coating layer, which is the main purpose of the pre-coating layer may not be improved, and thus, the range is defined as described above.

The ratio of the total thickness of the pre-coating layer and the tension coating layer to the thickness of the grain-oriented electrical steel sheet may be 35:1 to 75:1. When the ratio is above the upper limit, the film tension by the tension coating is insufficient, so that the iron loss improvement rate may be insignificant, and when the ratio is under the lower limit, coating layer is too thick to a parent material, so that an occupying ratio may be deteriorated when manufacturing a transformer, and thus, the range is defined as described above.

The composition of the tension coating layer may be 50 to 250 parts by weight of the colloidal silica, 5 to 15 parts by weight of chromium oxide, 5 to 15 parts by weight of the solid silica powder, and 20 to 100 parts by weight of the solvent, based on 100 parts by weight of the metal dihydrogen phosphate solution.

The colloidal silica in the tension coating layer serves to impart tensile stress by forming a ceramic layer having a low thermal expansion coefficient, when applying the tension coating agent on the pre-coated grain-oriented electrical steel sheet, and heating it.

In order to carry out this function, the colloidal silica is required to be contained at 50 to 250 parts by weight, based on 100 parts by weight of the metal dihydrogen phosphates.

Since at less than 50 parts by weight, an appropriate ceramic layer is not formed, so that imparted tensile stress is insufficient, and above 250 parts by weight, the solid content of the tension coating agent is increased, thereby deteriorating the surface quality of the steel sheet, the content was limited as such.

Further, the chromium oxide was introduced in order to improve corrosion resistance, which is caused by a self-healing effect and a corrosion barrier effect, possessed by chrome in the chromium oxide.

In order to carry out this function, the chromium oxide is required to be contained at 5 to 15 parts by weight, based on 100 parts by weight of the metal dihydrogen phosphates.

Since at less than 5 parts by weight, there is no effect of corrosion resistance by the introduction of chromium, and above 15 parts by weight, the viscosity of the coating agent is increased, so that coatability is poor, and stickiness on the coat is resulted after drying, the content was limited as such.

Further, the solid silica powder was introduced in order to increase the viscosity of the tension coating agent, thereby improving the coatability and improving the insulation property of the coat formed by the tension coating agent.

In order to carry out this function, the chromium oxide is required to be contained at 5 to 15 parts by weight, based on 100 parts by weight of the metal dihydrogen phosphates.

Since at less than 5 parts by weight, the effect of the coating agent of increasing viscosity is insignificant, so that there is no influence on coatability improvement, and above 15 parts by weight, overcoating may be resulted by the increased viscosity of the coating agent, the content was limited as such. This results in cracks in the coat, which leads to reduced insulation of materials.

Meanwhile, the metal dihydrogen phosphates may be one or more selected from the group consisting of aluminum dihydrogen phosphate, magnesium dihydrogen phosphate and a combination thereof. This serves as the tension coating agent and a binder to provide adhesive strength of the pre-coated grain-oriented electrical steel sheet.

In still another embodiment of the present invention, a method of manufacturing a grain-oriented electrical steel sheet, including: preparing a grain-oriented electrical steel sheet from which a forsterite ($Mg_2SiO_4$) film is removed; forming a pre-coating layer on a surface of the grain-oriented electrical steel sheet from which the forsterite ($Mg_2SiO_4$) film is removed; and forming a tension coating layer on a surface of the pre-coated grain-oriented electrical steel sheet, is provided, wherein the pre-coating layer includes an acid containing boron (B) and a solvent, and adhesion between the grain-oriented electrical steel sheet from which the forsterite ($Mg_2SiO_4$) film is removed and the tension coating layer is controlled by the pre-coating layer.

Specifically, the steps of forming the pre-coating layer and forming the tension coating layer are carried out in the planarization annealing step which is the final course of the manufacture of the grain-oriented electrical steel sheet, and are advantageous in the process since application at low temperature after acid-washing and correction is very easy.

Further, the tension coating layer is formed after forming the pre-coating layer on the surface of the grain-oriented electrical steel sheet from which the forsterite ($Mg_2SiO_4$) film (base coating layer) is removed, thereby overcoming coat separation occurring when applying only the tension coating layer, and at the same time, imparting excellent film tension, as described above.

Hereinafter, the manufacturing method of the grain-oriented electrical steel sheet according to an embodiment of the present invention will be described in more detail. However, specific description will be omitted for the overlapping part with the above description.

For manufacturing the grain-oriented electrical steel sheet according to an embodiment of the present invention, overall control of the manufacturing process of the grain-oriented electrical steel sheet is needed as the premise.

Specifically, the step of preparing the grain-oriented electrical steel sheet from which the forsterite ($Mg_2SiO_4$) film is removed includes preparing a steel slab including Sn: 0.03 to 0.07 wt %, Sb: 0.01 to 0.05 wt %, P: 0.01 to 0.05 wt %, Fe and other inevitably added impurities; hot-rolling the steel slab to prepare a hot-rolled sheet; subjecting the hot-rolled sheet to annealing and acid-washing; cold-rolling the annealed and acid-washed steel sheet to prepare a cold-rolled sheet; decarbonizing and nitriding-annealing the cold-rolled sheet; and high temperature annealing the decarbonized and nitrided-annealed steel sheet, wherein the decarbonized and nitriding-annealing is carried out at dew point in a range of 35 to 55° C., and the high temperature annealing is carried out by applying an additive containing MgO.

Particularly, by controlling the $SiO_2$ oxide layer to be formed by the decarbonizing and the nitriding-annealing, the base coating layer interfering with magnetic domain transfer of the grain-oriented electrical steel sheet may be formed to the minimum in the former part of the subsequent step (that is, high temperature annealing process), and then removed in the latter part of the high temperature annealing process.

For this purpose, the hot-rolled sheet may have a thickness of 2.0 to 2.8 mm, and the cold-rolled sheet may have a thickness of 0.23 mm.

The step of decarbonizing and nitriding-annealing the cold-rolled sheet may be carried out by passing it through a heating furnace controlled by wet atmosphere. In this case, Si having the highest oxygen affinity among the composition of the steel slab reacts with oxygen supplied from water vapor in the furnace to form a $SiO_2$ oxide layer first on the surface of the steel sheet, and then oxygen penetrates into the steel sheet to produce Fe-based oxides ($Fe_2SiO_4$, fayalite).

Here, when the $SiO_2$ oxide layer is formed thin on the surface of materials by controlling the dew point, the crack temperature, and the atmosphere gas, and the fayalite is produced at a very small amount, the removal of the base coating layer in the high temperature annealing process as described below is advantageous.

Specifically, in the high temperature annealing process, the $SiO_2$ oxide layer may react with MgO slurry in a solid state, and more specifically, the base coating is formed by the following Chemical Reaction Formula 1:

$$2Mg(OH)_2+SiO_2 \rightarrow Mg_2SiO_4+2H_2O. \qquad 1:$$

Here, in order to accomplish a complete chemical reaction, a catalyst material between two solids is needed, and the fayalite may serve as the catalyst.

In this regard, the manufacturing method according to an embodiment of the present invention is not required to form the $SiO_2$ oxide layer and the fayalite in large amounts, differently from the commonly known manufacturing method.

After manufacturing a specimen in which the $SiO_2$ oxide layer is controlled by the step of decarbonizing and nitriding-annealing, an additive containing MgO is applied to perform the step of high temperature annealing.

The additive may include MgO; an annealing separating agent including antimony oxychloride (SbOCl) and antimony sulfate ($Sb_2(SO_4)_3$); and water.

Specifically, the annealing separating agent including antimony oxychloride (SbOCl) and antimony sulfate ($Sb_2(SO_4)_3$) may be mixed with MgO and water and applied, and finally, be annealed at high temperature on a coil.

Here, the high temperature annealing process may be carried out at a heating rate of 18 to 35° C./hr in a temperature range of 700 to 950° C., and at a heating rate of 10 to 15° C./hr in a temperature range of 950 to 1200° C. Further, it may be carried out at a heating rate of 30 to 80° C./hr from room temperature to 700° C.

That is, the former part of the high temperature annealing process is a fast heating rate section corresponding to a temperature range of 700 to 950° C., and the latter part corresponds to a temperature range of 950 to 1200° C., to which a slow heating rate is applied, considering secondary recrystallization.

Specifically, in the former part as mentioned, thermal decomposition of the annealing separating agent in the additive may occur, and more specifically, at around 280° C., the reaction corresponding to the following Chemical Reaction Formula 2 may occur:

$$2SbOCl \rightarrow Sb_2(s)+O_2(g)Cl_2(g) \qquad 2:$$

As shown in the Chemical Reaction Formula 2, in the case of chlorides in an oxychloride form, a Cl group may be produced only by thermal decomposition, and is distinguished from $BiCl_3$ or $SbCl_3$ from which a Cl group may be dissociated even in an aqueous solution.

Accordingly, in the high temperature annealing process, the Fe-based oxide may not occur by the antimony oxychloride (SbOCl), and furthermore, inhibition of roughness, gloss and iron loss by the Fe-based oxide may be prevented.

Chlorine ($Cl_2$) gas separated by the thermal decomposition does not escape out of the coil by pressure in the furnace acting on the coil, but rather, again enters by being diffused in a direction of the steel sheet surface, and forms $FeCl_2$ in at the interface of the steel sheet and the $SiO_2$ oxide layer. This course may be represented by the following Chemical Reaction Formula 3:

$$\text{Fe (steel sheet)}+Cl_2 \text{FeCl}_2 \text{ (formed on interface of steel sheet and } SiO_2 \text{ oxide layer)} \qquad 3:$$

When the temperature is raised to around 900° C. in the former part of the high temperature annealing process, the base coating layer according to Chemical Reaction Formula 1 may be formed on the top end of the steel sheet surface, by the reaction between MgO and $SiO_2$ as mentioned above.

When reaching the latter part of the high temperature annealing process, $FeCl_2$ which was formed at the interface of the steel sheet and the $SiO_2$ oxide layer begins to be decomposed at around 1025 to 1100° C., and as chlorine ($Cl_2$) gas resulted therefrom escapes into the top end of the steel sheet surface, the formed base coating layer may be released from the steel sheet. As a result, the preparation of the grain-oriented electrical steel sheet from which a forsterite ($Mg_2SiO_4$) film is removed may be completed.

After undergoing the final annealing process, a planarization annealing process corresponding to the final process of the grain-oriented electrical steel sheet may be carried out, and this may be subdivided into acid-washing and correcting, and coating and planarization annealing.

That is, by the subdivided processes, a step of acid-washing and correcting may be further included, after the step of high temperature annealing the decarbonized and nitrided-annealed steel sheet.

Specifically, since unreacted MgO may remain in the steel sheet after the high temperature annealing, it may be removed by dilute sulfuric acid, and then washed by water and dried.

Meanwhile, a general coating and planarization annealing is carried out in order to impart insulation and tension to the grain-oriented electrical steel sheet to reduce insulation and iron loss, while removing internal stress included in the high temperature annealing process as the former step.

However, in the case of the grain-oriented electrical steel sheet from which the base coating layer is removed, the surface is not coated, since it is too attractive and has low roughness, differently from the grain-oriented electrical steel sheet including the base coating layer, and thus, may cause a serious problem in the planarization annealing.

In order to solve this, a method of directly applying a tension coating agent on the grain-oriented electrical steel sheet from which the base coating layer is removed, or a method of applying a tension coating agent after inducing surface change as pretreatment was generally considered.

Though the former method (directly applying a tension coating agent) may be carried out without modifying a conventional process, the film tension of the tension coating agent used above is needed to be lowered, and the low iron loss effect resulted from the removal of the base coating layer is difficult to obtained. That is, in this case, manufacturing the grain-oriented electrical steel sheet from which the base coating layer is removed may become meaningless.

Meanwhile, plasma pretreatment as one of the latter methods (adjusting surface tension by modifying the surface) needs large-scale facilities and has low economic efficiency, and thus, it has a limitation in that it is very difficult to apply it to a production site. Further, as another method, mechanical or chemical polishing of the surface may be applied, however, the mechanical polishing also needs a large-scale process for imparting artificial roughness, which is followed by economic burden. In the case of chemical polishing, there is restriction that the treatment speed is very slow, and also the surface roughness may not be easily controlled.

However, in an embodiment of the present invention, in the coating, a pre-coating layer is introduced, and a tension coating layer is formed thereon, thereby solving problems which are still not eliminated in spite of the conventionally proposed method.

Specifically, as a measure of securing adhesion of a coating while maintaining the conventional process as much as possible of course, and improving tension by a coat, it is proposed to introduce a pre-coating layer having a mid-thermal expansion coefficient between that of the grain-oriented electrical steel sheet from which the base coating layer is removed and that of the tension coating layer.

That is, the step of forming a pre-coating layer on a surface of the grain-oriented electrical steel sheet from which the forsterite ($Mg_2SiO_4$) film is removed may include: preparing a mixed solution of an acid containing boron (B) and water; applying the mixed solution on the grain-oriented electrical steel sheet; and drying the grain-oriented electrical steel sheet on which the mixed solution is applied.

As described above, in the case of a general grain-oriented electrical steel sheet including the base coating layer, tensile stress is applied by the difference from the thermal expansion coefficient of the tension coating layer formed on the base coating layer, thereby planning an iron loss reducing effect. This is eventually the force occurring in the cooling process after applying a coating agent during the coating process, however, when the above-indicated adhesion is insufficient, coat release may occur.

In order to solve this problem for imparting adhesion between the grain-oriented electrical steel sheet from which the base coating layer is removed and the tension coating agent, a pre-coating layer is introduced therebetween.

Specifically, the acid containing boron (B) may be at least one selected from the group consisting of borinic acid, boronic acid, boric acid and a combination thereof.

Further, the mixed solution may further include metal dihydrogen phosphates; and silicate compound.

The pre-coating agent composition has a higher thermal expansion coefficient than that of a common tension coating agent, however, may have similar components for compatibility with the tension coating agent.

Thus, in an embodiment of the present invention, the content of phosphates is increased, and the content of the silicate compound is greatly decreased, relative to the common tension coating agent.

That is, the step of preparing a mixed solution of the acid containing boron (B) and water may be carried out by adding 20 to 40 parts by weight of the silicate compound, 5 to 15 parts by weight of the acid containing boron (B), and 300 to 500 parts by weight of water, based on 100 parts by weight of the metal dihydrogen phosphates, and mixing them.

The metal dihydrogen phosphates may be one or more selected from the group consisting of aluminum dihydrogen phosphate ($Al(H_2PO_4)_3$), magnesium dihydrogen phosphate ($Mg((H_2PO_4)_2$) and a combination thereof.

The pre-coating agent composition may be as described above.

Meanwhile, the step of applying the mixed solution on the grain-oriented electrical steel sheet may be carried out by evenly distributing 0.5 to 3.0 g/m² of the mixed solution on the surface of the grain-oriented electrical steel sheet.

Since at less than 0.5 g/m², the resulted coat is extremely thin, so that the effect of improving adhesion is insignificant, and above 3.0 g/m², cracks may occur by the weight of the coat itself, the coating amount was limited as described above.

The step of drying the grain-oriented electrical steel sheet on which the mixed solution is applied may be carried out by drying at a temperature range of 250 to 550° C. for 15 to 30 seconds.

The reason for limiting the above range is that when the drying is carried out at less than 250° C. for less than 15 seconds, there is no effect of relieving thermal impact, and also coat hardness may be poor due to incomplete drying, and when the drying is carried out at more than 550° C. for more than 30 seconds, the adhesion with the tension coating layer is lowered due to increased coat hardness.

Meanwhile, the step of forming a tension coating layer on the surface of the pre-coated grain-oriented electrical steel sheet may include preparing a tension coating agent including colloidal silica and metal dihydrogen phosphates; applying the tension coating agent on the pre-coated grain-oriented electrical steel sheet; heating the grain-oriented electrical steel sheet on which the tension coating agent is applied; and slowly cooling after the heating step.

Specifically, the composition of the tension coating layer is as described below, and more specific description therefor is as described above, and thus, will be omitted.

The composition of the tension coating layer may be 50 to 250 parts by weight of colloidal silica, 5 to 15 parts by weight of chromium oxide, 5 to 15 parts by weight of solid silica powder, and 20 to 100 parts by weight of a solvent, based on 100 parts by weight of the metal dihydrogen phosphates.

The metal dihydrogen phosphates may be one or more selected from the group consisting of aluminum dihydrogen phosphate, magnesium dihydrogen phosphate and a combination thereof.

Here, the step of applying the tension coating agent on the pre-coated grain-oriented electrical steel sheet may be carried out by evenly distributing 0.5 to 6.0 g/m² of the tension coating agent on the surface of the pre-coated grain-oriented electrical steel sheet.

The reason for limiting the coating amount of the tension coating agent is that above 6.0 g/m², the occupying ratio is decreased when manufacturing a transformer, and at less than 0.5 g/m², the tension effect by the coat is insignificant.

The step of heating the grain-oriented electrical steel sheet on which the tension coating agent is applied may be carried out by heating at a temperature range of 550 to 900° C. for 10 to 50 seconds.

Out of the above temperature range, the film tension by curing the silica compound which is the main component of the coat may not be expected, and out of the time range, the coat may be undried due to short drying time, or decreased commercial value due to decreased productivity of a product may be expected when being treated for a long time, and thus, the ranges were limited, respectively, as described above.

After the heating step, the slowly cooling step may be carried out at a temperature range of 200 to 550° C. for 10 to 30 seconds.

At less than 200° C. for less than 10 seconds, coat is released by thermal impact due to quenching, and above 550° C. for more than 30 seconds, since productivity is lowered due to excessive slow cooling, it becomes very difficult to practically apply it, and thus, the temperature and time of slow cooling were limited as described above. Further, the effect of such limitation will be confirmed in detail by the Experimental Examples as described below.

DETAILED DESCRIPTION OF THE EMBODIMENTS

Hereinafter, the preferred Preparation Example and Examples of the present invention will be described. However, these are only one preferred Preparation Example and one preferred Example of the present invention, and the present invention is not limited thereto.

(PREPARATION EXAMPLE) FORMATION OF PRE-COATING LAYER ON GRAIN-ORIENTED ELECTRICAL STEEL SHEET FROM WHICH BASE COATING LAYER IS REMOVED

A pre-coating layer was formed on a grain-oriented electrical steel sheet from which the base coating layer is removed, according to an embodiment of the present invention.

Preparation of Grain-Oriented Electrical Steel Sheet from which Base Coating Layer is Removed Specifically, the preparation course of the grain-oriented electrical steel sheet from which the base coating layer is removed is as follows:

First, a steel slab including Si: 3.26 wt %, C: 0.055 wt %, Mn: 0.12 wt %, Sol. Al: 0.026 wt %, N: 0.0042%, S: 0.0045 wt %, Sn: 0.05 wt %, Sb: 0.03 wt %, and P: 0.03 wt % was prepared.

The prepared steel slab was hot-rolled using a rolling mill, and subjected to annealing and acid-washing, and thereafter, cold-rolled into a thickness of 0.23 mm.

On the cold-rolled steel sheet, an additive was applied at a dew point range of 50 to 70° C. using a decarbonizing annealing furnace, and then the steel sheet was decarbonizing-annealed. Here, the additive was a mixed solution of MgO, an annealing separating agent including antimony oxychloride (SbOCl) and antimony sulfate ($Sb_2(SO_4)_3$), and water at a weight ratio of 1:0.25:10.

The decarbonized and nitrided-annealed steel sheet was heated at a heating rate of 50° C./hr from room temperature to 700° C., at a heating rate of 25° C./hr from 700 to 950° C., and at a heating rate of 12.5° C./hr from 950 to 1200° C., and finally was high temperature annealed.

The grain-oriented electrical steel sheet from which the base coating layer is removed was obtained through the high temperature annealing step, and then treated with 5% dilute sulfuric acid for 10 seconds in order to remove unreacted MgO, and washed with water and dried at 60° C. for 15 seconds, thereby being subjected to acid-washing and correction.

Formation of Pre-Coating Layer

The course for forming the pre-coating layer on the grain-oriented electrical steel sheet from which the base coating layer is removed is as follows:

As the composition shown in the following Table 1, a mixed solution (i.e., pre-coating agent) of metal dihydrogen phosphates, a silicate compound, borinic acid and water was prepared.

Specifically, the pre-coating agent was prepared by adding 10 g of borinic acid, 400 g of water, and no colloidal silica, or varied amount in a range of 5 to 60 g of colloidal silica, based on 100 g of mixed aluminum and magnesium phosphates.

After the prepared pre-coating agent was evenly applied on the grain-oriented electrical steel sheet from which the base coating layer is removed, drying at 850° C. for 30 seconds was carried out.

As a result, the base coating layer was removed, and the grain-oriented electrical steel sheet on which the pre-coating layer was formed was obtained.

(PREPARATION COMPARATIVE EXAMPLE) FORMATION OF PRE-COATING LAYER ON GENERAL GRAIN-ORIENTED ELECTRICAL STEEL SHEET

In the Preparation Example, the pre-coating layer was formed in the same manner, except for not removing the base coating layer.

As a result, a general grain-oriented electrical steel sheet on which the pre-coating layer was formed was obtained.

(PREPARATION EXPERIMENTAL EXAMPLE) EVALUATION OF ADHESION OF PRE-COATING LAYER

In the case that the pre-coating layer is formed by the Preparation Example and the Preparation Comparative Example, the pre-coated surface bends in one direction by tensile stress addition. The tension by a coat may be evaluated by measuring this bending degree.

Further, through the evaluation results of the tension by a coat, the adhesion may be indirectly confirmed. Specifically, the effect of improved tensile stress by the coating may be confirmed by the following Equation:

$$\sigma_{RD}=2E_c\delta(\alpha_{Si-Fe}-\alpha_{chemical\ reaction})\Delta T(1-V_{RD})+\text{Adhesion effect}$$

More specifically, SRA was subjected to heat treatment at 750° C. for 2 hours under the 100% dry $N_2$ gas atmosphere, an insulation property is represented as a receiving current value when flowing current of 0.5 V, 1.0 A under pressure of 300 PSI, and adhesion is represented as a minimum circular arc diameter without coat release when bending specimens at 180° in contact with 10, 20, 30, 40 and 100 mmφ circular arcs, respectively, before and after SRA.

Here, Table 1 is results of each adhesion, for Preparation Example and Preparation Comparative Example according to various contents of the silicate compound in the pre-coating agent.

As shown in Table 1 it may be confirmed that the adhesion of the Preparation Example is better than that of Preparation Comparative Example, and among the Preparation Example, the adhesion is particularly excellent when the silicate compound is at 20 g to 40 g (Preparation Examples 5 to 7).

That is, it may be evaluated that the pre-coating layer in this case has strong adhesion with the grain-oriented electrical steel sheet from which the base coating is removed, and has a thermal expansion coefficient to overcome coat release. Furthermore, it is inferred that the pre-coating layer is adhered to the surface of the grain-oriented electrical steel sheet from which the base coating layer is removed well, and serves to improve the adhesion with the tension coating layer to be treated later.

As a result, the content of the silicate compound in the pre-coating agent according to an embodiment of the present invention is defined as being 20 to 40 parts by weight, based on 100 parts by weight of the metal dihydrogen phosphates.

TABLE 1

<Evaluation of adhesion by pre-coating layer>

| Specimen type | Classification | Metal dihydrogen phosphates (g) | Silicate compound (g) | Borinic acid (g) | Adhesion (mmφ)) | Remarks |
|---|---|---|---|---|---|---|
| Base coating-free product | Preparation Example 1 | 100 | 0 | 10 | 50 | |
| | Preparation Example 2 | 100 | 5 | 10 | 45 | |
| | Preparation Example 3 | 100 | 10 | 10 | 30 | |
| | Preparation Example 4 | 100 | 15 | 10 | 25 | |
| | Preparation Example 5 | 100 | 20 | 10 | 20 | |
| | Preparation Example 6 | 100 | 30 | 10 | 20 | |
| | Preparation Example 7 | 100 | 40 | 10 | 20 | |
| | Preparation Example 8 | 100 | 50 | 10 | 60 | |
| | Preparation Example 9 | 100 | 60 | 10 | 80 | |
| | Preparation Comparative Example | — | — | — | 100 | General tension coating |

(EXAMPLE) MANUFACTURE OF GRAIN-ORIENTED ELECTRICAL STEEL SHEET FROM WHICH BASE COATING LAYER IS REMOVED AND ON WHICH PRE-COATING LAYER AND TENSION COATING LAYER ON SURFACE OF THE PRE-COATING LAYER ARE FORMED

According to Preparation Example 6, the base coating layer was removed, and a tension coating layer was formed on the surface of the grain-oriented electrical steel sheet on which the pre-coating layer was formed.

For this purpose, tension coating agent was applied at 4.0 g/m² and dried, and then slowly cooled. The tension coating agent was obtained by mixing 100 g of metal dihydrogen phosphates having a weight ratio of aluminum dihydrogen phosphate:magnesium dihydrogen phosphate of 64, 130 g of colloidal silica, 12 g of chromium oxide, 6 g of solid silica powder, and 50 g of a solvent.

However, the drying and slow cooling pattern was variously added according to the following Table 2.

Specifically, the temperature when drying was varied in a temperature range of 800 to 900° C., and the slow cooling time was the same at 25 seconds, but the temperature of 250 or 300° C. was applied. According to each condition, they were referred to as Examples 1 to 6.

(COMPARATIVE EXAMPLE) MODIFICATION OF DRYING AND SLOW COOLING CONDITIONS OF EXAMPLE

In the Example, the tension coating layer was formed by the same process except that the drying and slow cooling pattern was differentiated.

Specifically, the temperature when drying was varied at a temperature range of 800 to 900° C., and the slow cooling process was not applied, or the slow cooling time was the same at 10 seconds, but the temperature of 100 or 200° C. was applied. According to each condition, they were referred to as Examples 1 to 9.

(EXPERIMENTAL EXAMPLE) EVALUATION OF ADHESION AND COATING TENSION FOR EXAMPLE AND COMPARATIVE EXAMPLE

For the Example and Comparative Example, the adhesion and coating tension were evaluated, and the evaluation method thereof is as described above.

According to the evaluation results shown in Table 2, it was confirmed that in the case of immediately cooling at room temperature regardless of the drying temperature (Comparative Examples 1, 4 and 7), coat release by thermal impact was not overcome, thereby deteriorating adhesion.

In contrast, when slowly cooling at a certain temperature for a certain period of time, coat release may be overcome, and it was confirmed that in the case of being at 250° C. or more for 25 seconds, such effect is particularly excellent (Examples 1 to 6).

Accordingly, the slow cooling step according to an embodiment of the present invention is defined as carrying out at a temperature range of 250 to 550° C. for 15 to 30 seconds.

TABLE 2

<Evaluation of adhesion and coating tension by tension coating layer>

| Specimen type | Classification | Drying step temperature (° C.) | Slow cooling step temperature (° C.) | Slow cooling step time (sec) | Adhesion (mmφ) | Coating tension (kgf/mm²) |
|---|---|---|---|---|---|---|
| Pretreatment coating (base coating-free specimen) | Example 1 | 800 | 250 | 25 | 15 | 0.45 |
| | Example 2 | 800 | 300 | 25 | 15 | 0.48 |
| | Example 3 | 850 | 250 | 25 | 15 | 0.45 |
| | Example 4 | 850 | 300 | 25 | 15 | 0.60 |
| | Example 5 | 900 | 250 | 25 | 25 | 0.45 |
| | Example 6 | 900 | 300 | 25 | 25 | 0.45 |
| | Comparative Example 1 | 800 | — | — | 60 | 0.05 |
| | Comparative Example 2 | 800 | 100 | 10 | 35 | 0.35 |
| | Comparative Example 3 | 800 | 200 | 10 | 30 | 0.40 |
| | Comparative Example 4 | 850 | — | — | 80 | 0.05 |
| | Comparative Example 5 | 850 | 100 | 10 | 80 | 0.25 |
| | Comparative Example 6 | 850 | 200 | 10 | 45 | 0.30 |
| | Comparative Example 7 | 900 | — | — | 70 | 0.06 |
| | Comparative Example 8 | 900 | 100 | 10 | 55 | 0.04 |
| | Comparative Example 9 | 900 | 200 | 10 | 45 | 0.30 |

The present invention is not limited to the Preparation Example and Examples, but may be manufactured in various forms which are different from each other, and a person skilled in the art to which the present invention pertains may understand that other specific forms may be carried out without modifying the technical concept or essential features of the present invention. Therefore, it should be understood that the Preparation Example and Example as described above are illustrative, and not restrictive in all aspects.

The invention claimed is:

1. A grain-oriented electrical steel sheet comprising:
    a pre-coating layer formed on a surface of the grain-oriented electrical steel sheet; and
    a tension coating layer formed on a surface of the pre-coating layer,
    wherein the grain-oriented electrical steel sheet is a grain-oriented electrical steel sheet from which a forsterite ($Mg_2SiO_4$) film is removed,
    the pre-coating layer includes an acid containing boron (B)), metal dihydrogen phosphates, and silica, and
    adhesion between the grain-oriented electrical steel sheet and the tension coating layer is controlled by the pre-coating layer,
    wherein the acid containing boron (B) is at least one selected from the group consisting of borinic acid, boronic acid, boric acid and a combination thereof, and the pre-coating layer comprises 20 to 40 parts by weight of the silica and 5 to 15 parts by weight of the acid containing boron (B), based on 100 parts by weight of the metal dihydrogen phosphates.

2. The grain-oriented electrical steel sheet of claim 1, wherein:
    the metal dihydrogen phosphates in the pre-coating layer are
    one or more selected from the group consisting of aluminum dihydrogen phosphate ($Al(H_2PO_4)_3$), magnesium dihydrogen phosphate ($Mg((H_2PO_4)_2$) and a combination thereof.

3. The grain-oriented electrical steel sheet of claim 2, wherein:
    the silica in the pre-coating layer is
    one or more selected from the group consisting of silica dispersed in a dispersion medium in a colloid form, solid silica in a powder form and a combination thereof.

4. The grain-oriented electrical steel sheet of claim 2, wherein:
    a composition of the grain-oriented electrical steel sheet includes
    Sn: 0.03 to 0.07 wt %, Sb: 0.01 to 0.05 wt %, P: 0.01 to 0.05 wt %, Fe and other inevitably added impurities.

* * * * *